3,453,331
CATALYTIC SYNTHESIS OF KETONES
FROM ALDEHYDES
Charles W. Hargis, Howard S. Young, and Jefferson Wayne Reynolds, Kingsport, Tenn., assignors to Eastman Kodak Company, Rochester, N.Y., a corporation of New Jersey
No Drawing. Filed Aug. 19, 1966, Ser. No. 573,491
Int. Cl. C07c 45/10, 45/00, 49/00
U.S. Cl. 260—593                    16 Claims

ABSTRACT OF THE DISCLOSURE

Symmetrical and unsymmetrical ketones are produced from aldehydes or their mixtures by a process which comprises contacting the aldehyde or mixtures thereof with an oxidized form of a rare earth metal having an atomic number of 59 to 71 supported on activated alumina. The process is operated in the vapor phase at elevated temperatures. The process may be operated in the presence of steam.

DISCLOSURE

This invention relates to catalytic chemical reactions. More particularly, this invention is concerned with novel catalytic methods of producing ketones, and novel catalysts useful in such processes.

The conversion of aldehydes to ketones by catalytic means has been reported in the literature. See U.S. Patents 1,925,311 and 1,949,412. However, these patents and other prior art on the subject do not disclose the use of an oxidized form of a metal having an atomic number from 59 to 71 for catalyzing the process.

According to the present invention, it has been discovered that aliphatic aldehydes can be converted to aliphatic ketones by contacting the aldehyde or mixtures thereof with an oxidized form of a rare earth metal having an atomic number from 59 to 71 inclusive in the presence of water vapor at an elevated temperature suitable for effecting the reaction. The process can be conducted as a batch process or a continuous process.

More specifically, the present invention provides the process of reacting a compound of the formula

with a compound of the formula

by bringing said compounds together in the presence of steam and in contact with a catalyst comprising an oxidized form of a metal having an atomic number from 59 to 71, wherein R and $R_1$ are the same or different straight or branched chain lower alkyls such as methyl, ethyl, propyl, isopropyl and butyl.

When R and $R_1$ represent the same lower alkyl group the process leads to the formation of symmetrical ketones. However, when two different aldehydes are used as reactants, i.e. when R and $R_1$ are different lower alkyls, the resulting ketone will be unsymmetrical although there can also be some symmetrical ketones formed as by-products.

Among the aliphatic aldehydes which can be used as reactants in the process are acetaldehyde, propionaldehyde, isobutyraldehyde and butyraldehyde, or a mixture of two or more of these or other lower aliphatic aldehydes, i.e. aldehydes containing up to eight carbons in a noncyclic saturated aliphatic chain.

In order to effect the reaction it appears necessary that the metal having an atomic number from 59 to 71 be present in an oxidized form. Also, it is reasonable to expect that the metal is converted during the reaction from its oxidized form to intermediate salts of the reactants used or a salt of any catalyst support which might be employed. The oxide of the metal, nevertheless, seems to be a main form through which the catalytic activity of the metal is routed or mediated. The metal oxides thus can be used as such although it is suitable to employ compounds of these metals which are convertible to the oxides, including the metal carbonates, nitrates, acetates, oxalates and isobutyrates. When desired, mixtures of such compounds can also be used in forming the catalyst.

This invention also provides and utilizes catalysts which are particularly useful in effecting the described process. These special catalysts comprise a metal having an atomic number of 59 to 71 in an oxidized form supported on an activated alumina. Alumina alone is a poor catalyst for the reaction. The alumina support can be any of its active forms, including the gamma, eta, chi, kappa and theta forms.

The alumina supported catalyst can be readily formed by conventional procedures. In one procedure, a water-soluble metal salt can be dissolved in water and the aqueous solution poured over activated alumina particles. By calcining prior to use in the reaction, the salt is converted to the metal oxide supported on the alumina. However, instead of such a prior calcining it is sometimes feasible to effect the conversion from salt to oxide during the reaction. Particularly useful supported catalysts can contain about 1% to 25% by weight of a metal having an atomic number of 59 to 71 calculated as the oxide.

Representative of the catalysts provided herewith, and which are useful for producing ketones from aldehydes, are alumina-supported oxidized forms of one or more of the metals including praseodymium, neodymium, samarium, gadolinium, dysprosium and erbium.

Conversion of the aldehydes to the desired ketones using an unsupported, or alumina-supported, oxidized form of the metal catalyst can be readily achieved at an elevated temperature which effects the reaction, which generally will be from about 400° C. to 650° C.

The reaction is readily effected at atmospheric pressure. However, increased or decreased pressures such as of about 0.1 to 5 atmospheres can also be used satisfactorily.

The reaction is conveniently effected by vaporizing the aldehyde, then bringing it into contact with the catalyst and maintaining contact for sufficient time to effect reaction without forming excessive amounts of undesirable by-products. Usually a contact time of about 0.1 to 20 sec. is sufficient. The contact time in seconds is the milliliters of catalyst divided by the rate of flow of gaseous feed in milliliters per second at reaction conditions. The catalyst can be positioned in a suitable tube of glass or inert metal in a loosely packed state which permits the aldehyde vapor and steam to pass through.

For optimum yields of the desired ketones, water vapor, i.e. steam, should be present with the aldehyde at the time of reaction in a molar ratio of about 1 part aldehyde to about 1 to 25 parts steam.

Among the ketones produced by the described process from the appropriate aldehydes are acetone, diethyl ketone, methyl ethyl ketone, methyl propyl ketone, methyl isopropyl ketone and diisopropyl ketone. However, besides the desired ketones, acids corresponding to the aldehyde feed are made as by-products of the reaction. Thus, isobutyric acid is produced from isobutyraldehyde and steam, and acetic acid is produced from acetaldehyde and steam. These by-products can be readily separated from the ketones by conventional methods, such as distillation.

The ketones produced by this invention are well known compounds which have valuable uses as solvents for materials such as rubbers, elastomers, polyvinyl acetate, waxes, tars and other materials. They are also intermediates in making other products.

The following examples are presented to illustrate the invention. In these examples, yields and conversions are given in mole-percent.

Example 1

A catalyst containing 20% $Nd_2O_3$ on activated alumina was prepared as follows: The quantity of 81.5 g. (80 g. on a dry basis) of Harshaw Chemical Co. grade Al–0104T ⅛″ activated alumina tablets in an evaporating dish was impregnated with one-half of a 58 ml. aqueous solution containing 44.8 g. of neodymium nitrate [$Nd(NO_3)_3 \cdot XH_2O$, weight loss at 450° C., 55.48%] from the Lindsay Chemical Co. The mixture was stirred thoroughly, allowed to soak 45 min., and heated to 150° C. on a hot plate in 45 min. with constant stirring. Next, it was cooled to room temperature, treated with the second half of the neodymium nitrate solution, allowed to soak 1 hr., and heated as before to 150° C. on a hot plate. The resulting material was calcined 1 hr. at 300° C., then 3 hrs. at 500° C. in a muffle furnace, cooled, and placed in a screw-cap bottle.

The quantity of 25 ml. of 8–20 mesh catalyst prepared by crushing and screening the ⅛″ tablets was tested in the catalytic synthesis of diisopropyl ketone (DIPK) from isobutyraldehyde fed at 12 g. per hr. and steam fed at 6 g. per hr. Isobutyric acid was produced as a by-product. In two successive 5 hr. runs at 450° C. and 475° C., the following results were obtained:

| Run | Temp., °C. | Grams produced | | Percent yield | |
|---|---|---|---|---|---|
| | | DIPK | Acid | DIPK | Acid |
| 1 | 450 | 28.4 | 4.8 | 72.2 | 7.8 |
| 2 | 475 | 43.4 | 1.3 | 93.3 | 1.8 |

Example 2

A catalyst containing 20% $Pr_6O_{11}$ (calculated) on activated alumina was prepared from 20 g. of praseodymium oxide from the American Potash and Chemical Corporation and 81.5 g. (80 g. on dry basis) of grade Al–0104 alumina from the Harshaw Chemical Co. The praseodymium oxide was dissolved in 22 g. of conc. nitric acid and diluted to a volume of 58 ml. with distilled water. This solution was used to prepare the catalyst by two impregnation steps as described in Example 1. A volume of 25 ml. (8–20 mesh) of this catalyst tested as described in Example 1 gave the following results:

| Run | Temp., °C. | Grams produced | | Percent yield | |
|---|---|---|---|---|---|
| | | DIPK | Acid | DIPK | Acid |
| 1 | 450 | 20.3 | 7.9 | 84.0 | 21.2 |
| 2 | 475 | 39.2 | 1.6 | 91.0 | 2.4 |

Example 3

A catalyst containing 20% $Sm_2O_3$ (calculated) on activated alumina was prepared from 14 g. of samarium oxide from the American Potash and Chemical Corporation and 57.9 g. (56 g. on a dry basis) of grade Al–0104 alumina from the Harshaw Chemical Co. The samarium oxide was dissolved in 21.6 ml. of conc. nitric acid and diluted to 44 ml. with distilled water. This solution was used to prepare the catalyst by two impregnation steps as described in Example 1. Upon testing 25 ml. of 8–20 mesh catalyst material in the production of diisopropyl ketone from isobutyraldehyde as described in Example 1, the following results were obtained:

| Run | Temp., °C. | Grams produced | | Percent yield | |
|---|---|---|---|---|---|
| | | DIPK | Acid | DIPK | Acid |
| 1 | 450 | 31.2 | 3.5 | 79.6 | 13.8 |
| 2 | 475 | 39.2 | 0.3 | 83.2 | 0.5 |

Example 4

A catalyst containing 20% $Gd_2O_3$ (calculated) on activated alumina was prepared as described for the catalyst of Example 3 except 14 g. of gadolinium oxide from the American Potash and Chemical Corporation was used in place of the samarium oxide. Upon testing 25 ml. of 8–20 mesh catalyst material in the production of diisopropyl ketone from isobutyraldehyde, the following results were obtained:

| Run | Temp., °C. | Grams produced | | Percent yield | |
|---|---|---|---|---|---|
| | | DIPK | Acid | DIPK | Acid |
| 1 | 450 | 23.3 | 6.1 | 80.8 | 13.8 |
| 2 | 475 | 36.2 | 0.5 | 78.9 | 0.6 |

Example 5

A catalyst containing 20% $Dy_2O_3$ (calculated) on activated alumina was prepared as described for the catalyst of Example 3 except 14 g. of dysprosium oxide from the American Potash and Chemical Corporation was used in place of the samarium oxide. Upon testing 25 ml. of 8–20 mesh catalyst material in the production of diisopropyl ketone from isobutyraldehyde as described for Example 1, the following results were obtained:

| Run | Temp., °C. | Grams produced | | Percent yield | |
|---|---|---|---|---|---|
| | | DIPK | Acid | DIPK | Acid |
| 1 | 450 | 19.7 | 6.4 | 66.3 | 14.0 |
| 2 | 475 | 36.0 | 2.2 | 78.7 | 3.0 |

Example 6

A catalyst containing 20% $Er_2O_3$ (calculated) on activated alumina was prepared as described for the catalyst of Example 3 except 14 g. of erbium oxide from the American Potash and Chemical Corporation was used in place of the samarium oxide. Upon testing 25 ml. (8–20 mesh) of this catalyst as described for Example 1 the following results were obtained:

| Run | Temp., °C. | Grams produced | | Percent yield | |
|---|---|---|---|---|---|
| | | DIPK | Acid | DIPK | Acid |
| 1 | 450 | 12.4 | 8.7 | 70.6 | 32.0 |
| 2 | 475 | 29.2 | 4.4 | 87.1 | 8.3 |

Example 7

A catalyst containing 10% $Nd_2O_3$ (calculated) on activated alumina was prepared by the same method used in Example 1 from 410 g. of Harshaw grade Al–0104 T ⅛ in. activated alumina on a dry basis and 106.3 g. of neodymium nitrate [$Nd(NO_3)_3 \cdot XH_2O$, weight loss at 450° C. 57%] from the American Potash and Chemical Corp. in one impregnation.

A 25 ml. portion (⅛ in. tablets) of the catalyst was tested in the synthesis of methyl isopropyl ketone (MIPK) from acetaldehyde and isobutyraldehyde in the presence of steam in two successive 5 hr. runs. Acetone and diisopropyl ketone (DIPK) were produced as by-products. With feeds of 3.7 g. of acetaldehyde, 6.0 g. of isobutyraldehyde, and 6.0 g. of steam per hr., the following results were obtained:

| Run | Temp., °C. | Grams produced | | | Percent yield based on acetaldehyde | | Percent yield based on isobutyraldehyde | |
|---|---|---|---|---|---|---|---|---|
| | | Acetone | MIPK | DIPK | Acetone | MIPK | MIPK | DIPK |
| 1 | 450 | 2.1 | 18.5 | 5.5 | 17.3 | 51.3 | 52.1 | 23.4 |
| 2 | 475 | 1.9 | 17.8 | 5.2 | 15.8 | 49.6 | 49.6 | 22.1 |

Example 8

A quantity of 100 ml. of the catalyst described in Example 7 was tested in that same synthesis at 475° C. The feed rates were 84 g. acetaldehyde, 136 g. isobutyraldehyde and 137 g. of steam per hr. for a run which lasted 4 hrs. The product contained 35.6 g. of acetone, 232.2 g. of MIPK and 102.5 g. of DIPK. Acetaldehyde was present in the product but was not analyzed quantitatively. Conversions based on acetaldehyde were 18.2% for acetone and 35.6% for MIPK. Yields based on isobutyraldehyde were 43.8% for MIPK and 13.8% for DIPK.

Example 9

A quantity of 25 ml. of 8-20 mesh Harshaw grade Al-0104 alumina was tested in the synthesis of diisopropyl ketone (DIPK) from isobutyraldehyde and steam as described in Example 1. In four successive 2 hr. runs at 450° C., the following results were obtained:

| Run | Grams DIPK | Percent yield DIPK |
|---|---|---|
| 1 | 0.3 | 3.0 |
| 2 | 0.7 | 12.8 |
| 3 | 0.5 | 7.6 |
| 4 | 0.6 | 8.5 |

In similar tests using Alcoa grade F-1 alumina, yields of DIPK from 13.5% to 16.9% were obtained. Thus, these results show that alumina alone is not a good catalyst for this synthesis.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. The process which comprises reacting a compound of the formula

with a compound of the formula

by bringing said compounds together in contact with a catalyst comprising an oxidized form of a metal having an atomic number from 59 to 71 at an elevated temperature of about 400° C. to about 650° C. in the presence of water vapor to produce a compound of the formula

wherein R and R₁ are the same or different straight or branched lower alkyl groups.

2. The process of claim 1 in which a contact time of about 0.1 to 20 seconds is used.

3. The process of claim 1 in which the oxidized form of the metal is supported on an alumina selected from the group consisting of gamma, eta, chi, kappa and theta form and mixtures thereof.

4. The process of claim 1 in which the molar ratio of water vapor to aldehyde content is from about 1:1 to 25:1.

5. The process according to claim 1 which comprises reacting a compound of the formula

with a compound of the formula

by bringing said compounds together in the presence of water vapor and in contact with a catalyst comprising an oxide of a metal having an atomic number of 59 to 71 supported on activated alumina at an elevated temperature of about 400° C. to about 650° C. to produce a compound of the formula

wherein R and R₁ are the same or different straight or branched lower alkyl groups.

6. The process of claim 5 in which the molar ratio of water vapor to aldehyde content is from about 1:1 to 25:1.

7. The process of claim 5 in which R and R₁ are methyl.

8. The process of claim 5 in which R and R₁ are isopropyl.

9. The process of claim 5 in which R is methyl and R₁ is isopropyl.

10. The process of claim 5 in which the metal oxide is samarium oxide.

11. The process of claim 5 in which the metal oxide is neodymium oxide.

12. The process of claim 5 in which the metal oxide is praseodymium oxide.

13. The process of claim 5 in which the metal oxide is gadolinium oxide.

14. The process of claim 5 in which the metal oxide is dysprosium oxide.

15. The process of claim 5 in which the metal oxide is erbium oxide.

16. The process which comprises contacting isobutyraldedyde with a catalyst comprising from 1 to 25 weight percent of neodymium oxide supported on an alumina selected from the group consisting of gamma, eta, chi, kappa and theta form and mixtures thereof, at a temperature in the range of about 400° C. to about 650° C. in the presence of water vapor to produce diisopropyl ketone.

References Cited

UNITED STATES PATENTS

| 2,549,508 | 4/1951 | Mottern | 260—586 |
| 3,223,617 | 12/1965 | Maziuk | 208—138 |
| 2,945,057 | 7/1960 | McDaniel | 260—486 |
| 3,009,871 | 11/1961 | Komarewsky | 208—135 |

DANIEL E. WYMAN, Primary Examiner.

PHILIP M. FRENCH, Assistant Examiner.

U.S. Cl. X.R.

252—462